United States Patent [19]

Butler et al.

[11] Patent Number: 4,965,993
[45] Date of Patent: Oct. 30, 1990

[54] PLANT HARVESTER

[75] Inventors: Lee D. Butler, Kingsburg; Franklin P. Orlando, Morgan Hill; Don H. Lenker, Salinas, all of Calif.

[73] Assignee: FMC Corporation, Chicago, Ill.

[21] Appl. No.: 286,831

[22] Filed: Dec. 20, 1988

[51] Int. Cl.⁵ ................................................ A01D 45/00
[52] U.S. Cl. .................................. 56/327.1; 56/14.5; 56/DIG. 2; 198/510.1
[58] Field of Search .............. 56/13.7, 13.8, 13.9, 56/14.3, 14.5, 14.6, 327.1, 327.2, DIG. 2, DIG. 10; 198/510.1

[56] References Cited

U.S. PATENT DOCUMENTS

| | | | |
|---|---|---|---|
| 2,599,715 | 6/1952 | Lepper | 198/510.1 X |
| 2,670,584 | 3/1954 | Rood, Jr.; et al. | 198/510.1 X |
| 3,330,363 | 7/1967 | Greedy | 56/327.1 |
| 3,365,869 | 1/1968 | Whiteley | 56/327.1 |
| 3,921,374 | 11/1975 | Mizzi | 56/DIG. 10 X |
| 4,090,568 | 5/1978 | Johnson | 56/327.1 X |
| 4,202,157 | 5/1980 | Rood, Jr. | 198/510.1 X |
| 4,335,570 | 6/1982 | Fitzmaurice | 56/327 |
| 4,524,572 | 6/1985 | Witde et al. | 56/327.1 |
| 4,697,406 | 10/1987 | Whitley | 56/327.1 |

Primary Examiner—William P. Neuder
Attorney, Agent, or Firm—A. J. Moore; R. C. Kamp; R. B. Megley

[57] ABSTRACT

A mobile plant harvester for harvesting plants having foliage or vines such as cucumbers, includes an inclined main conveyor having an upper run and an inclined gripping conveyor supported by a vertically adjustable sub-frame and having an arcuate lower and upper end portions and parallel upper and lower runs. The foliage gripping conveyor includes a plurality of foliage gripping bars which open when moving around the lower arcuate end portion to gently gather the foliage and crop and then close to grip the foliage and transport the foliage and crop upwardly for release onto the main conveyor with a minimum of crop loss. The harvester also includes means for cutting the foliage horizontally, and means for maintaining the foliage gripping conveyor and foliage cutters at the desired height when moving over rough ground are also disclosed.

28 Claims, 12 Drawing Sheets

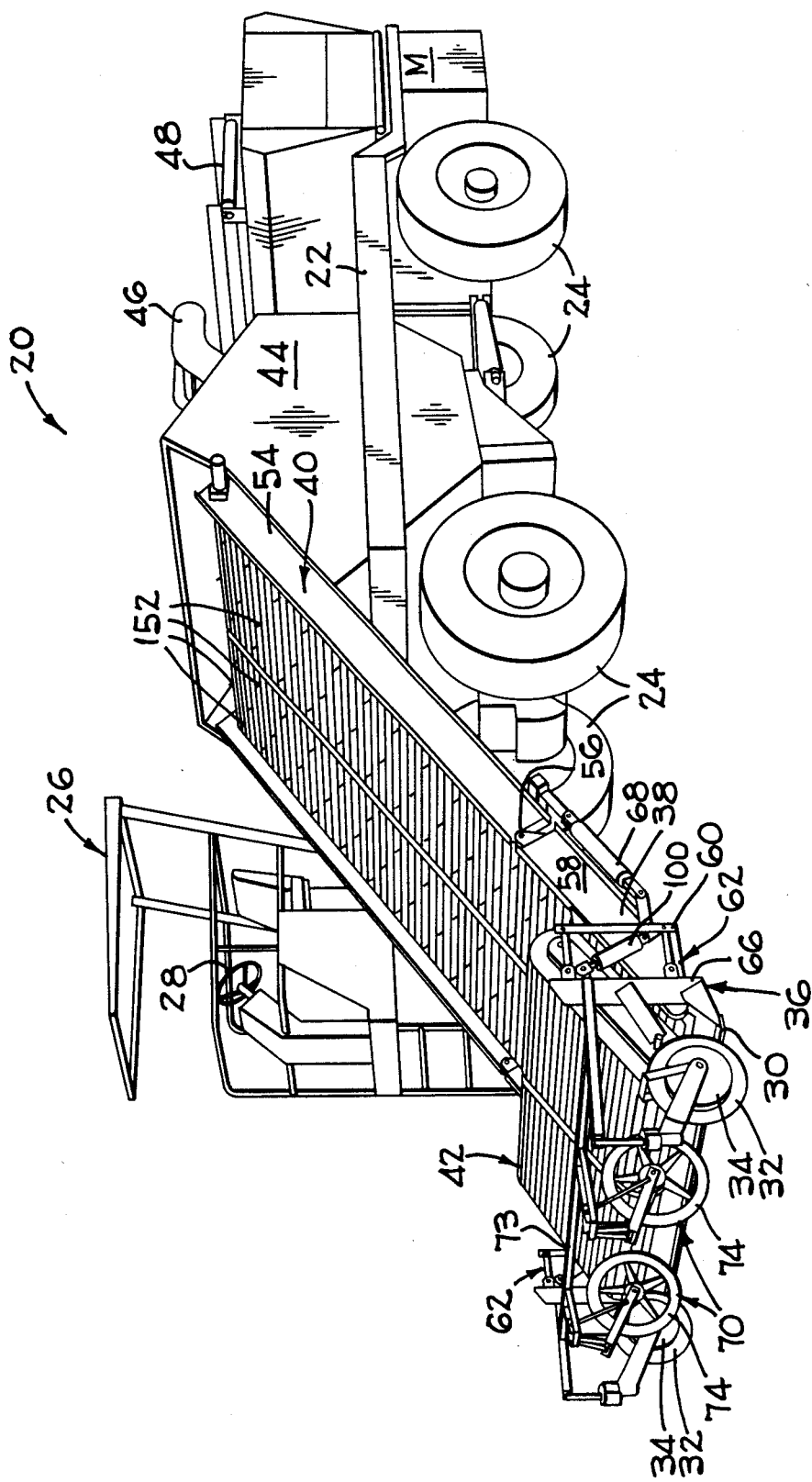

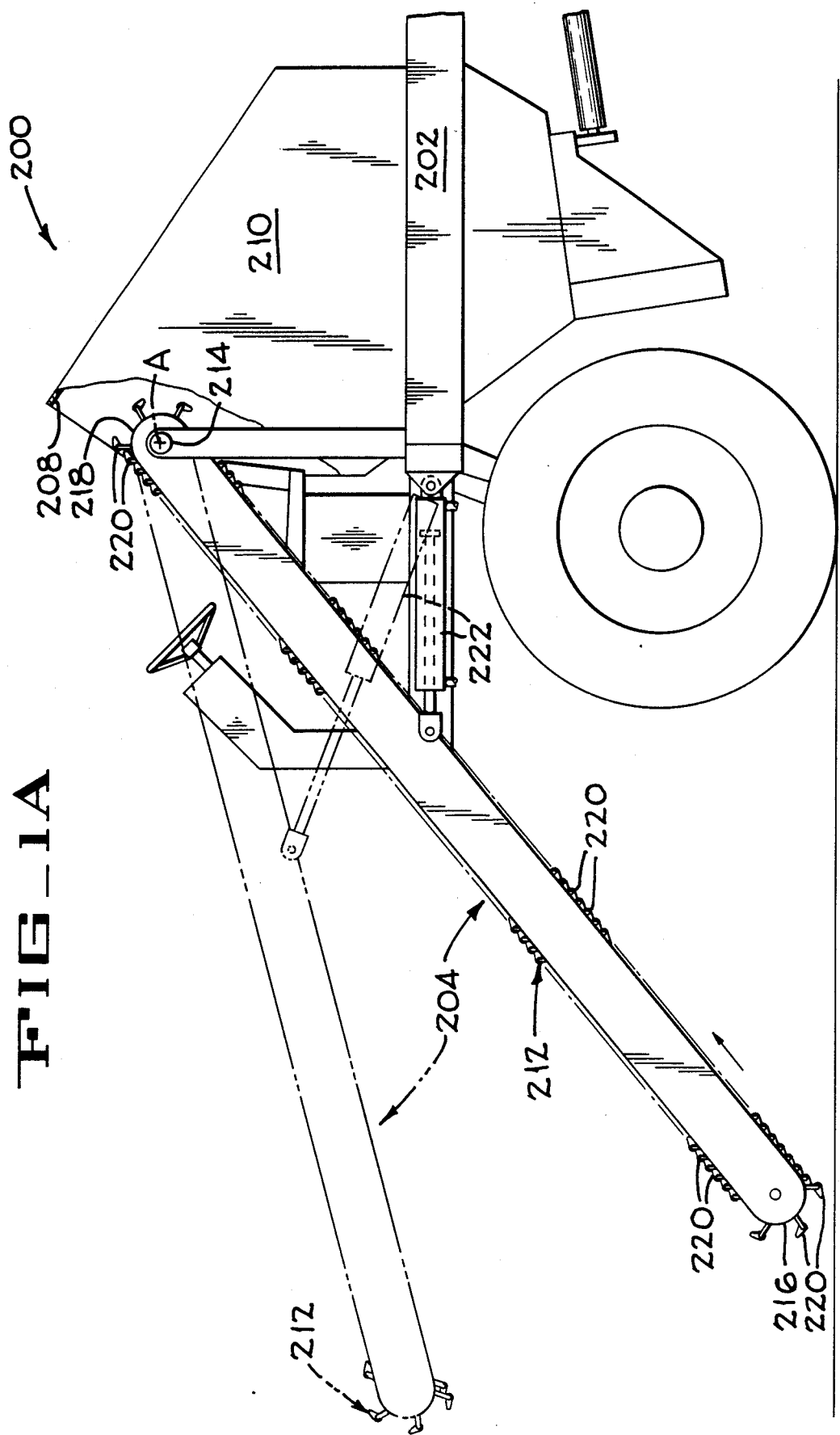
FIG_1A

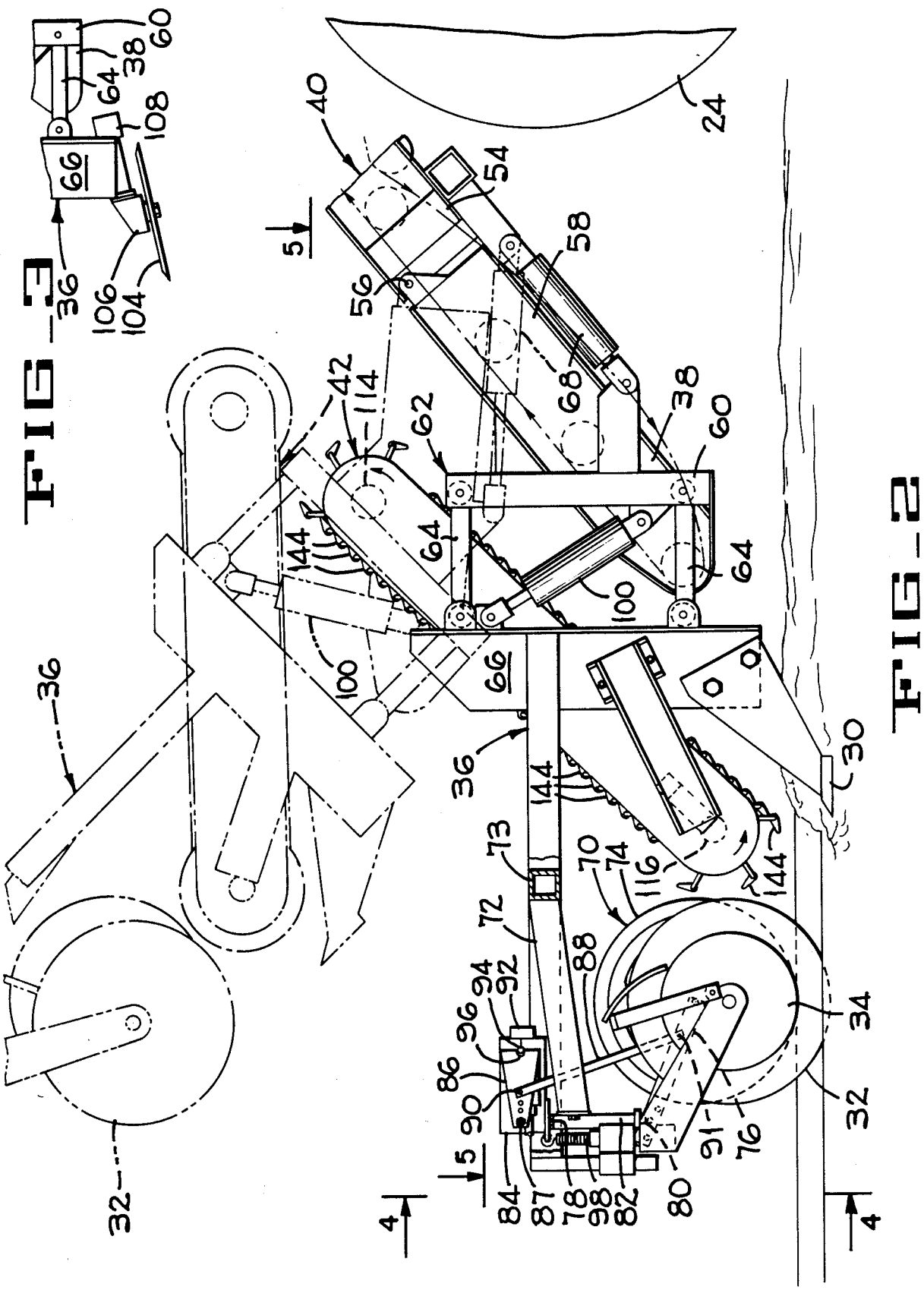

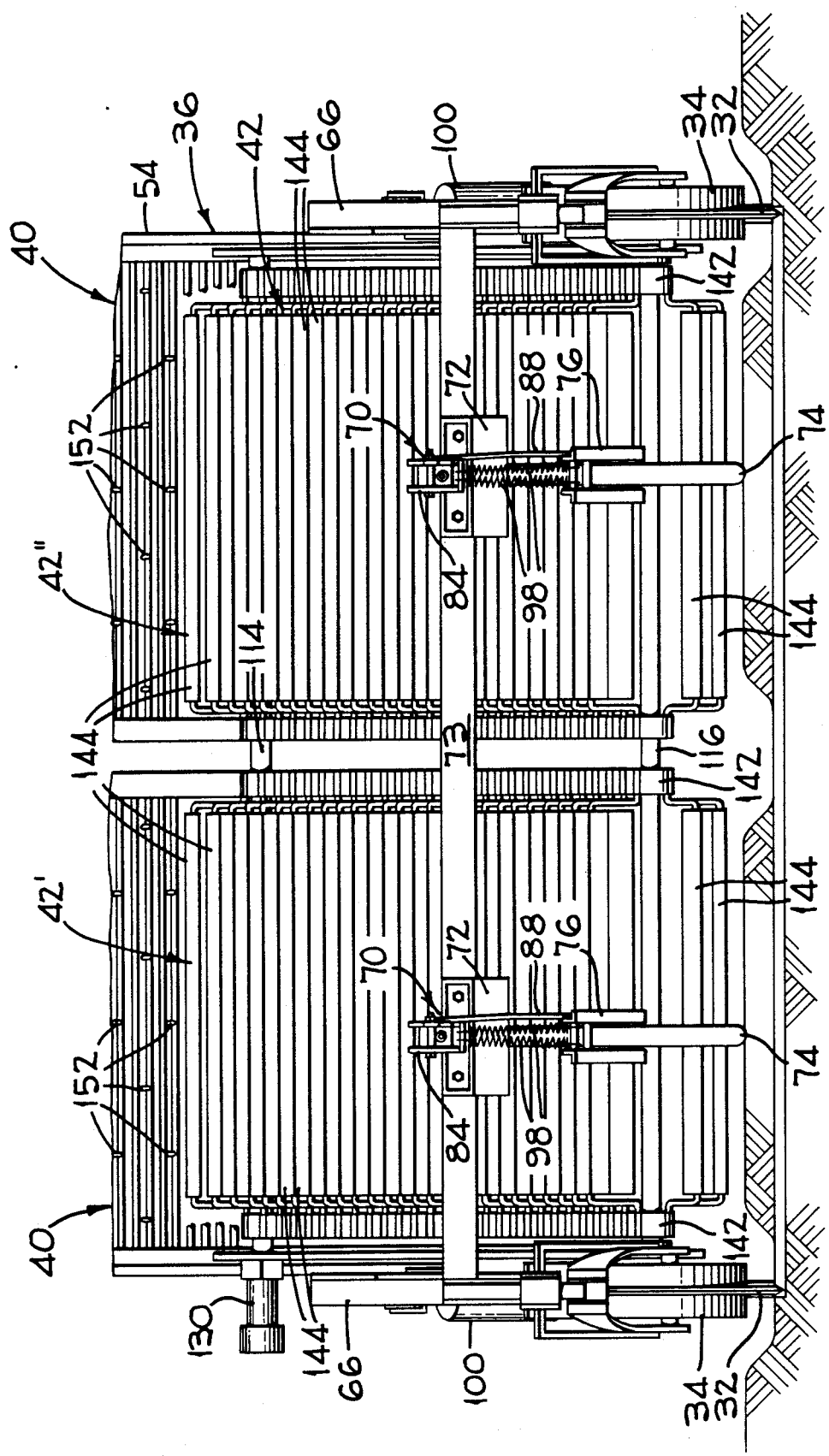

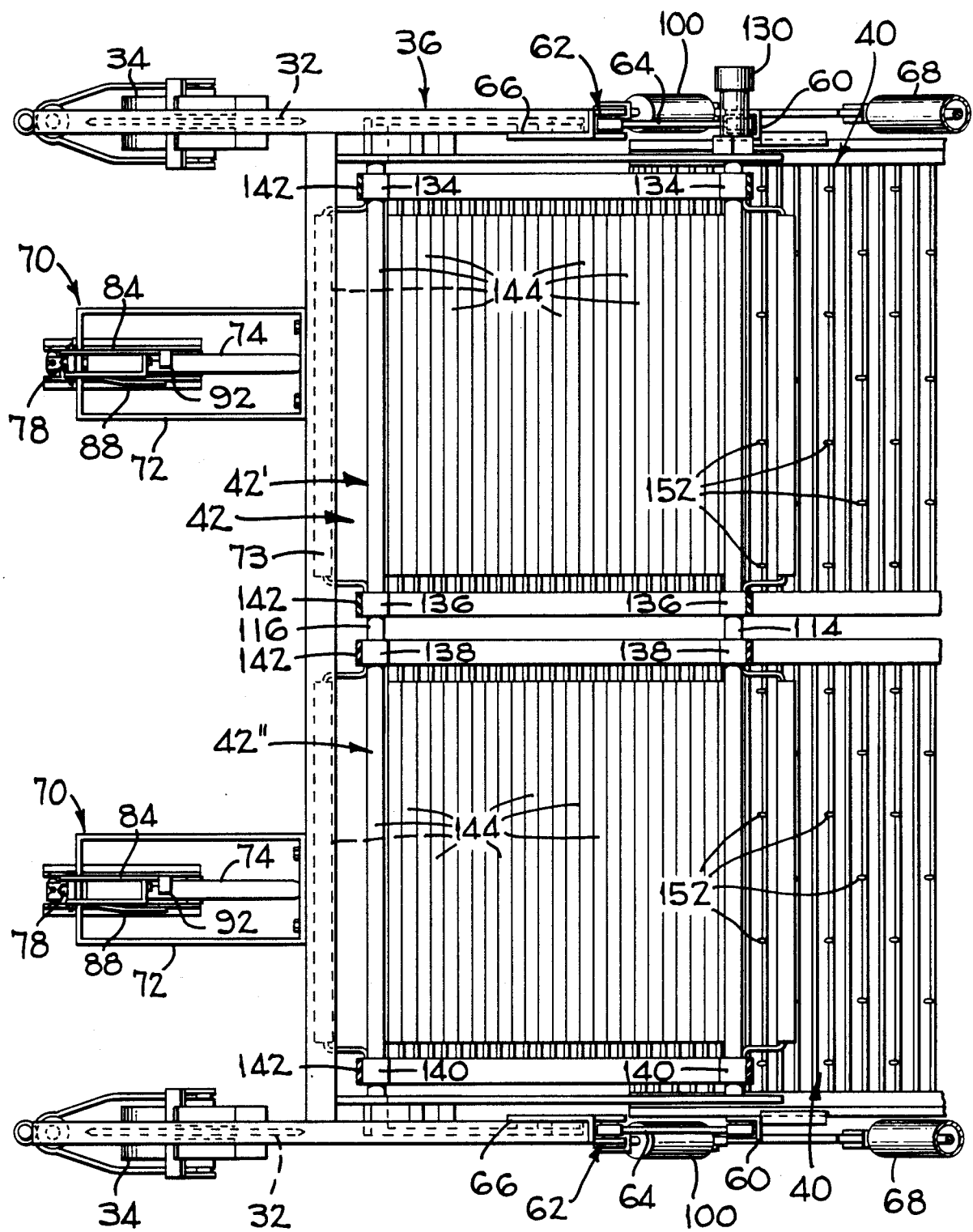
FIG_5

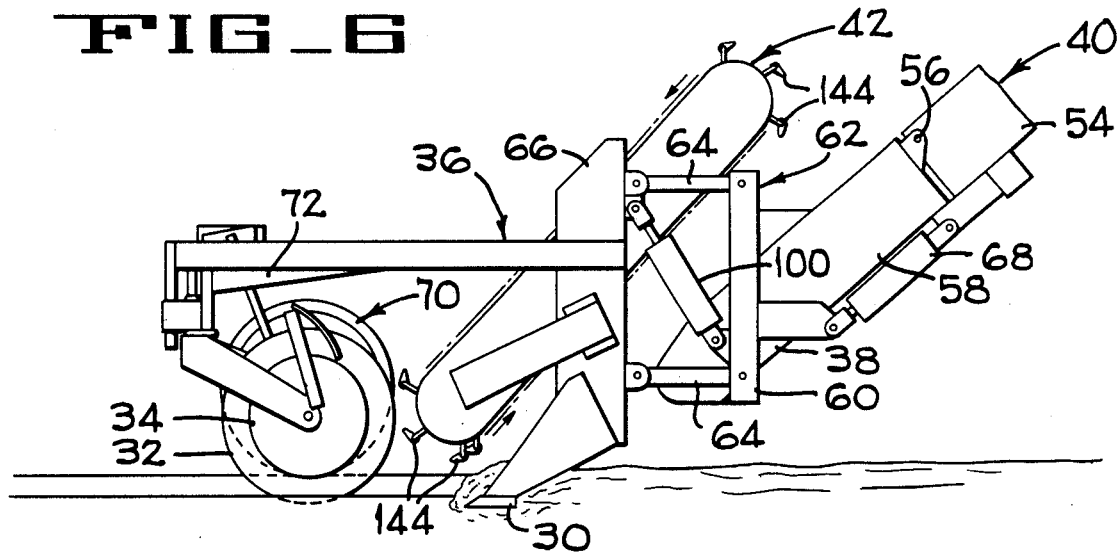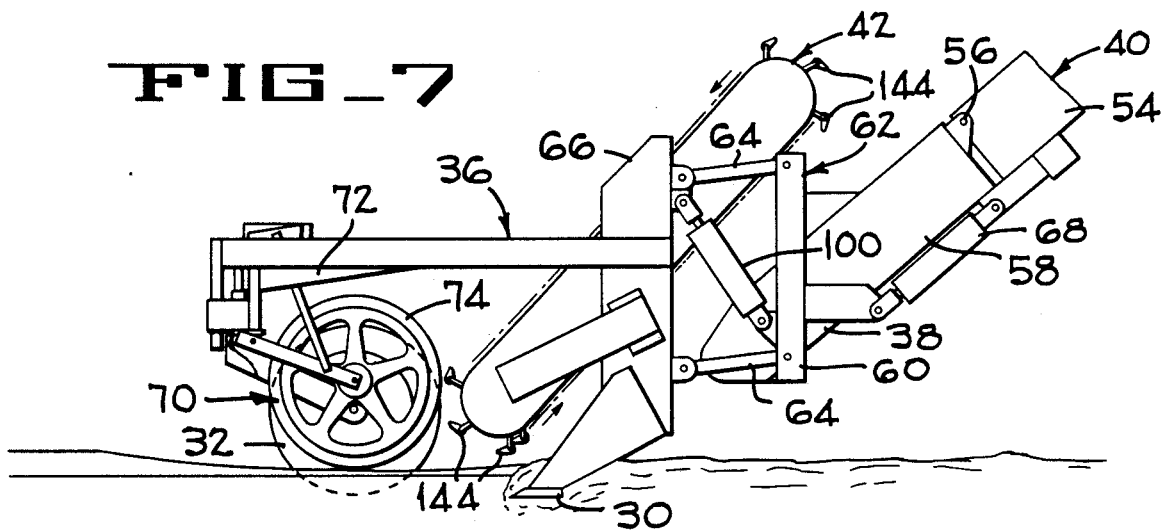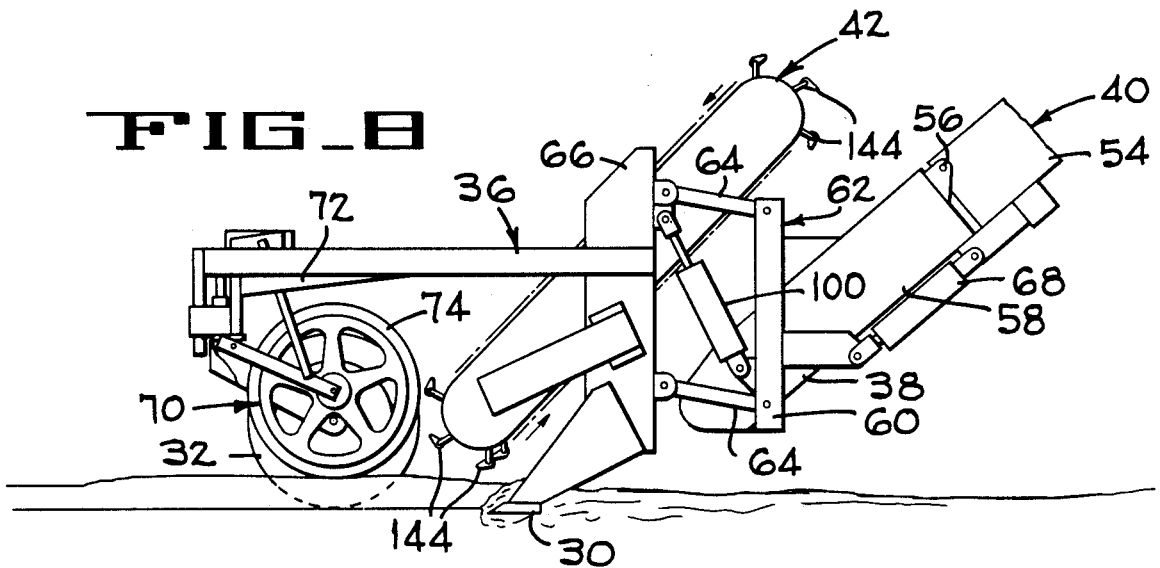

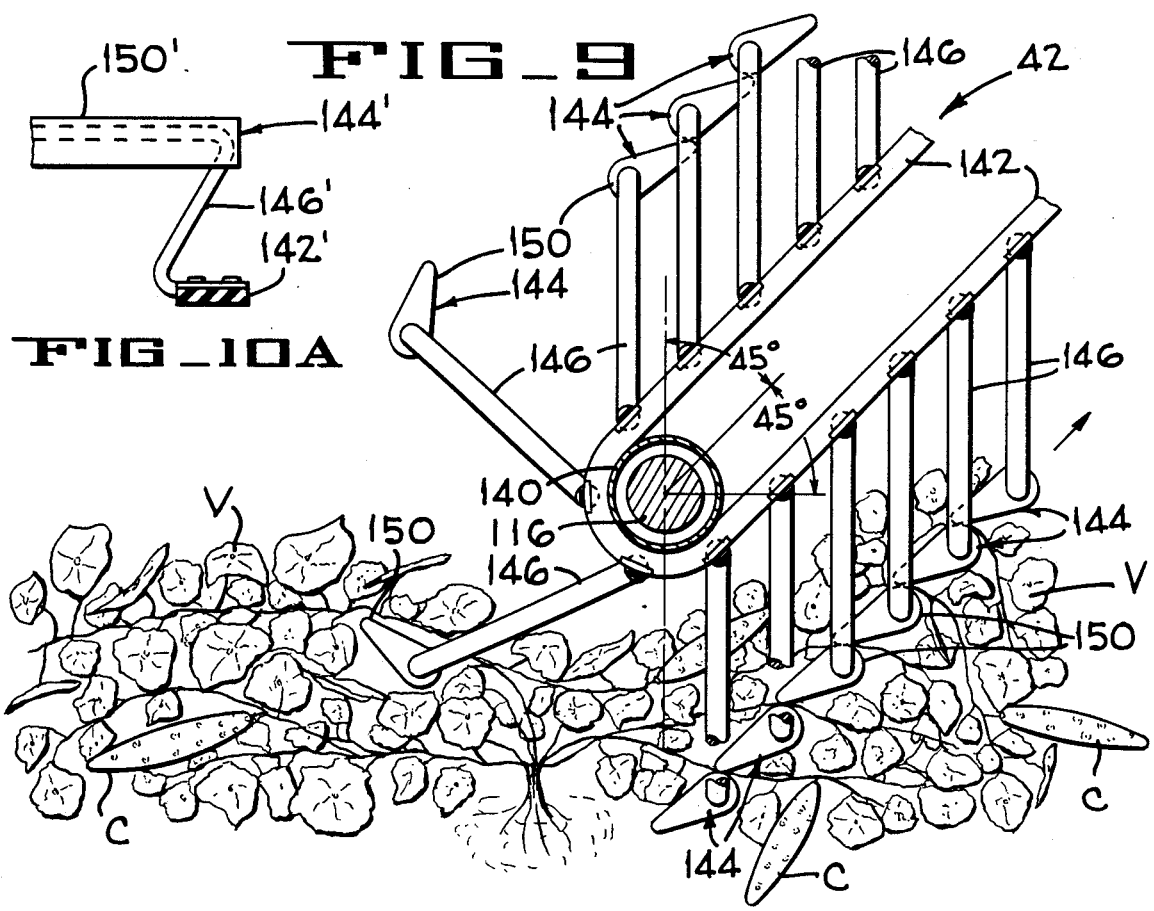
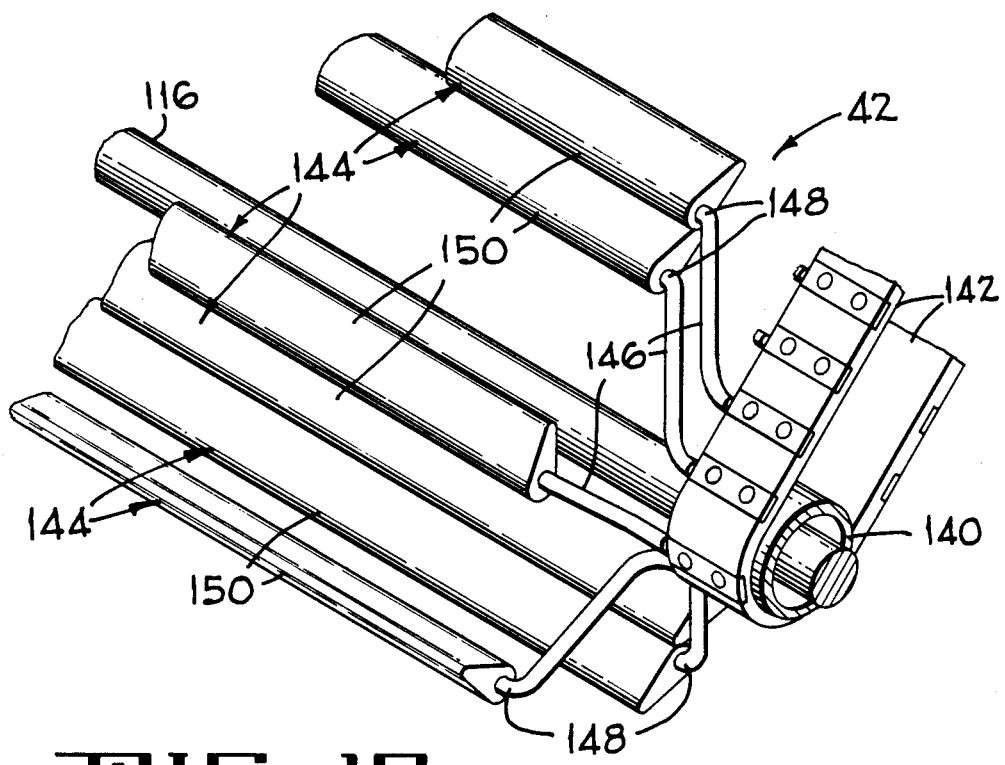

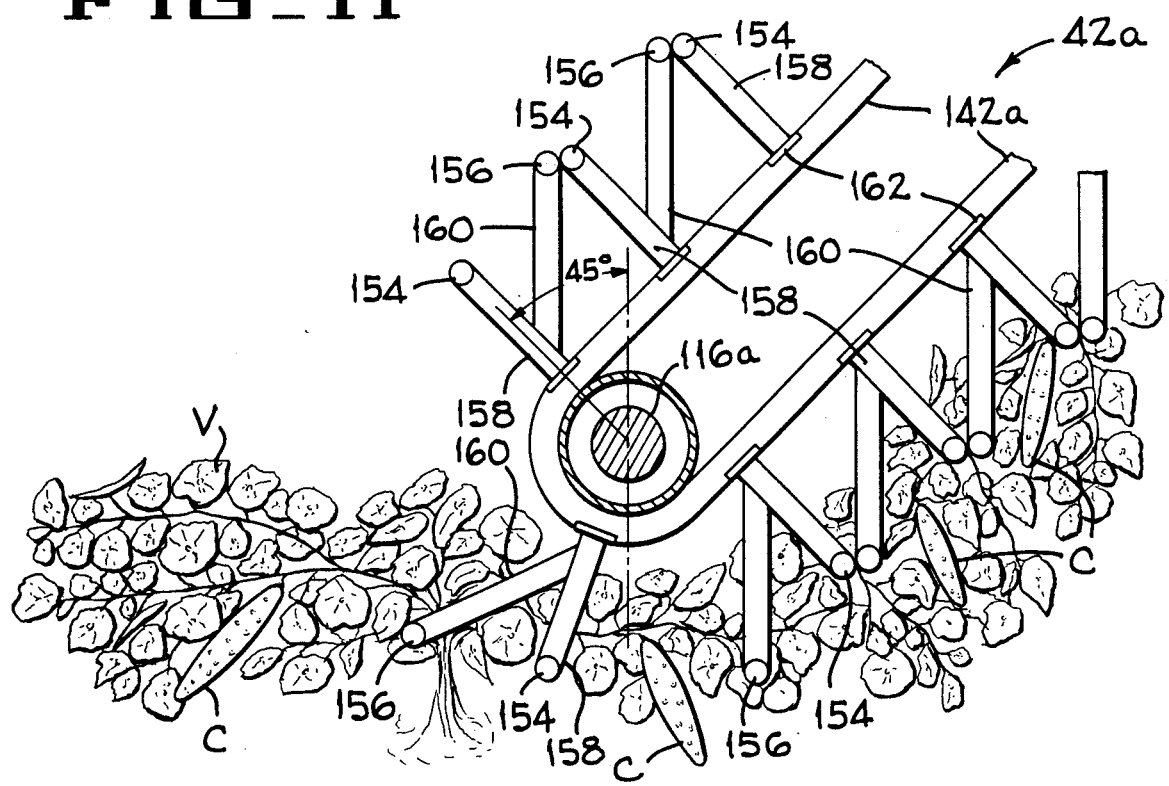
FIG_11
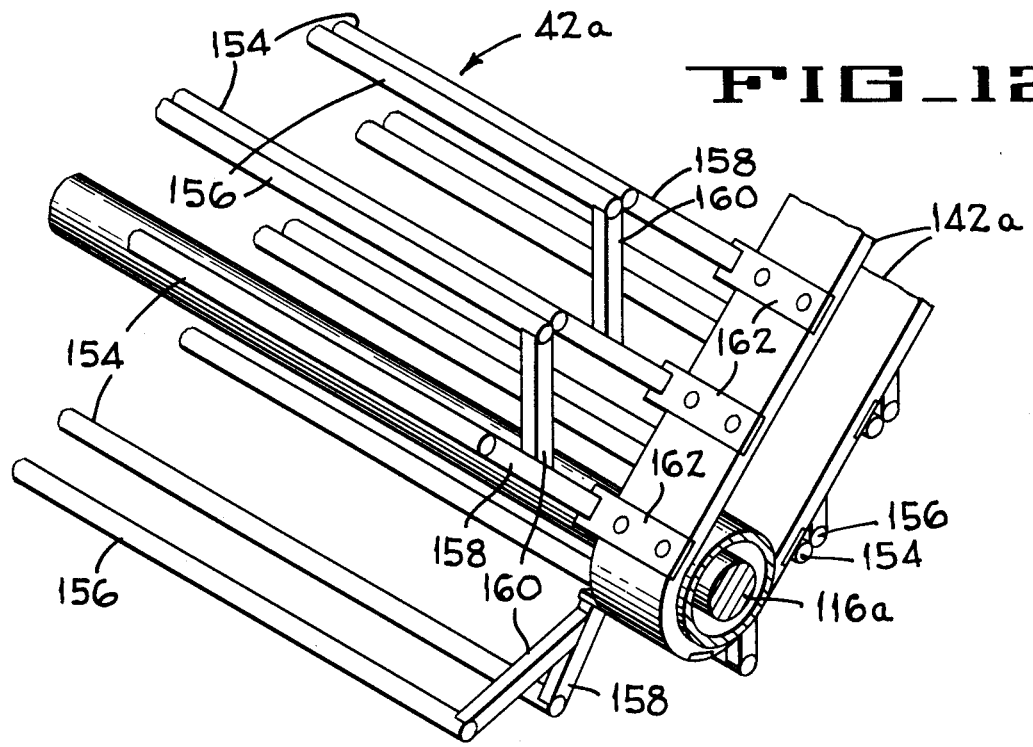
FIG_12

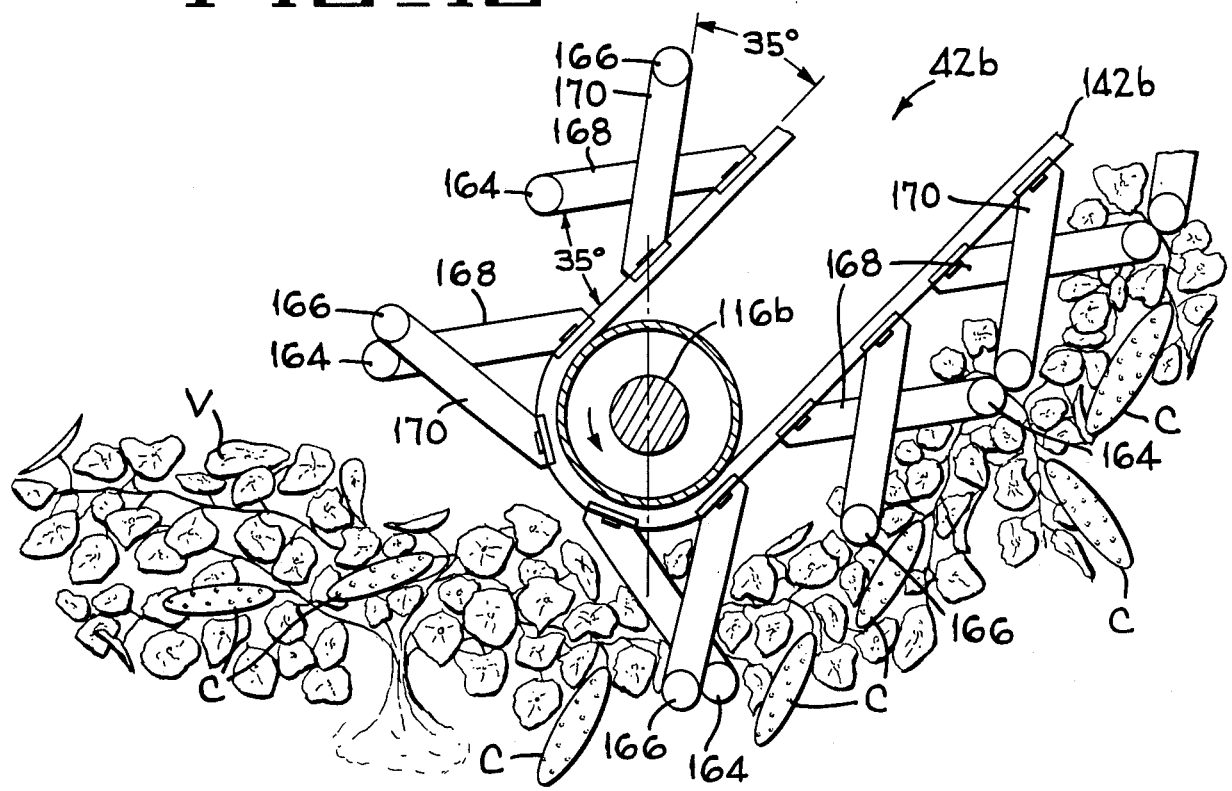
FIG_13
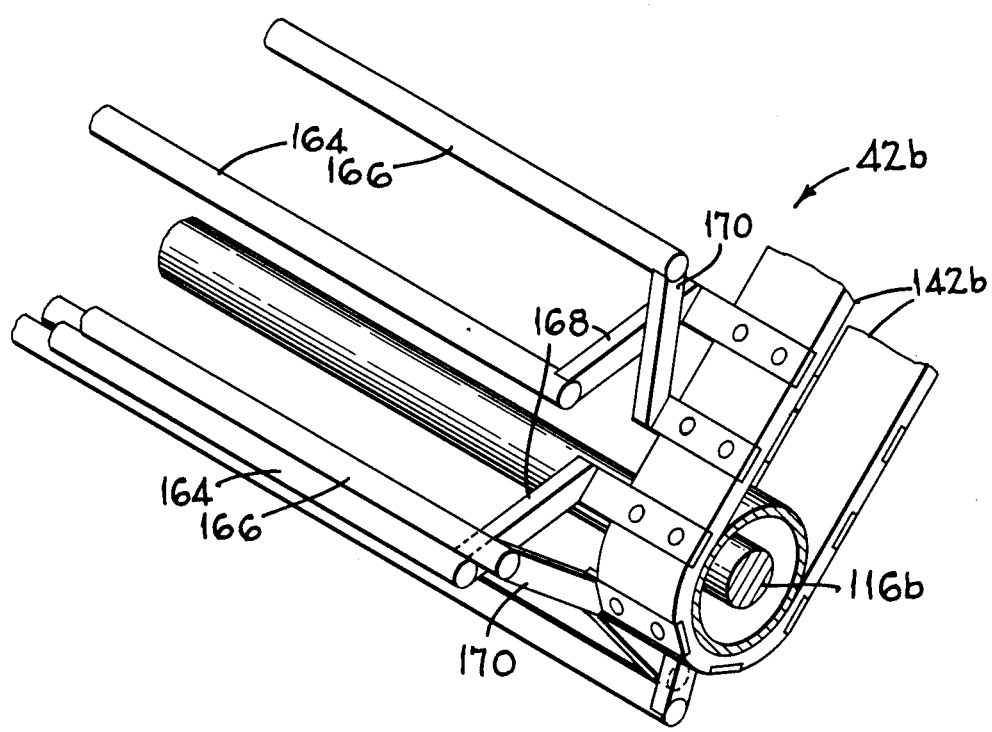
FIG_14

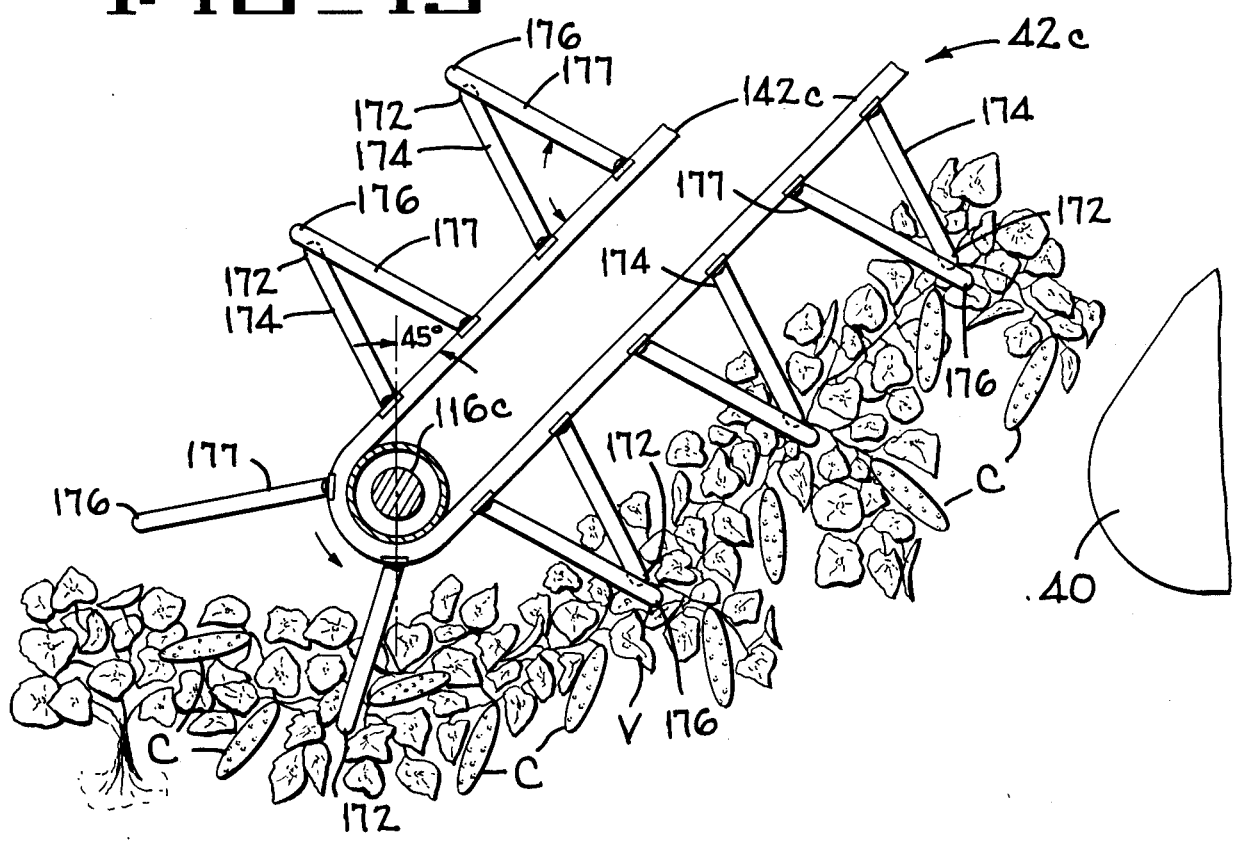
FIG_15
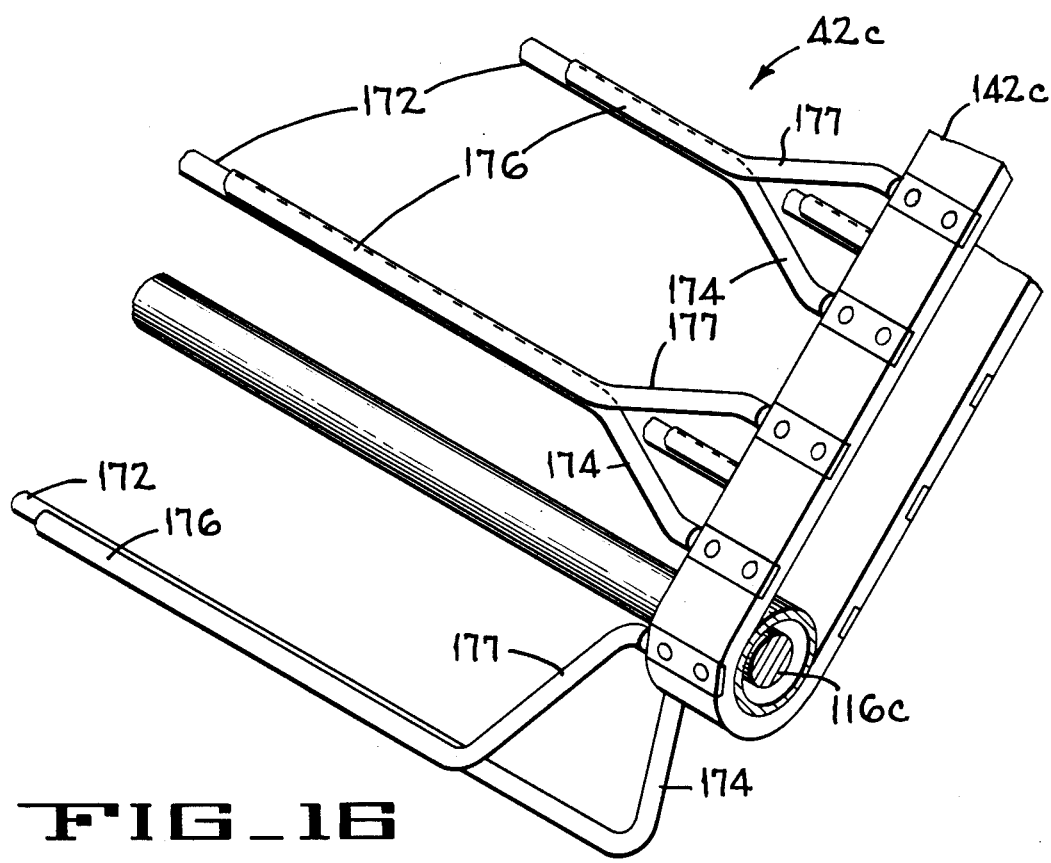
FIG_16

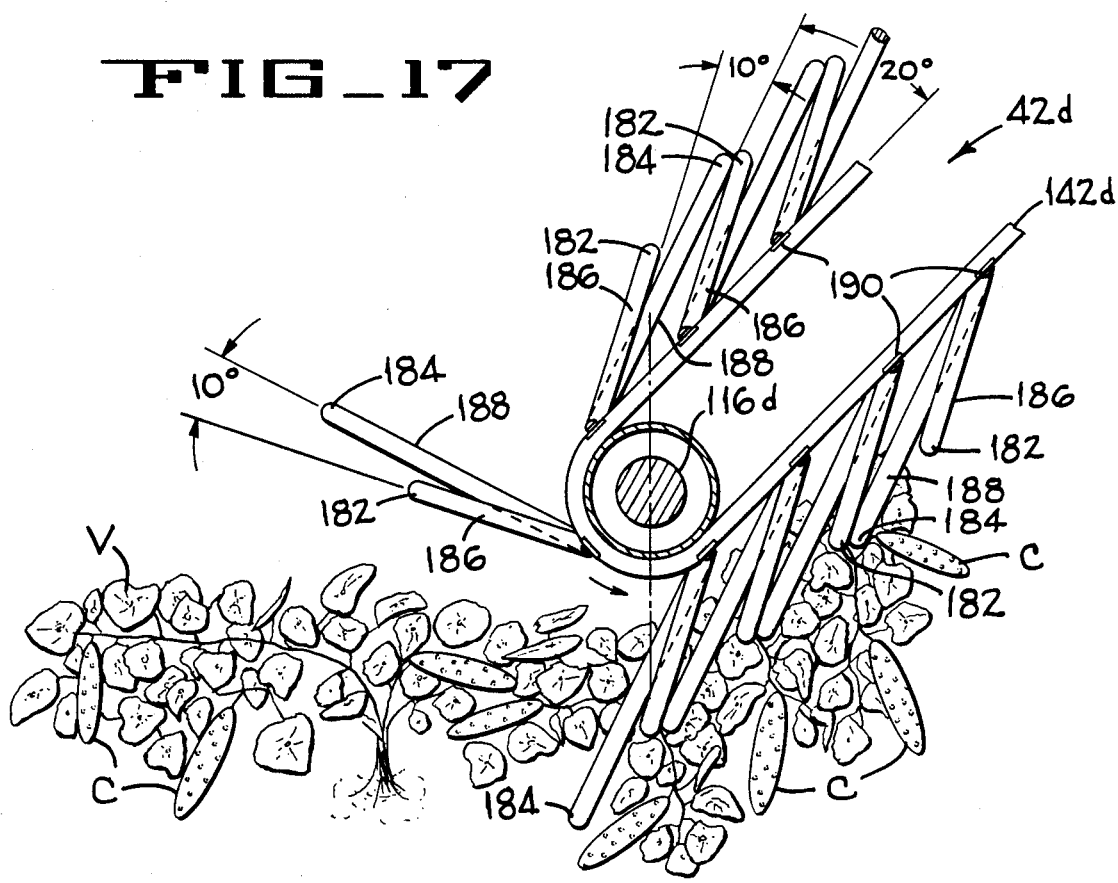
FIG_17
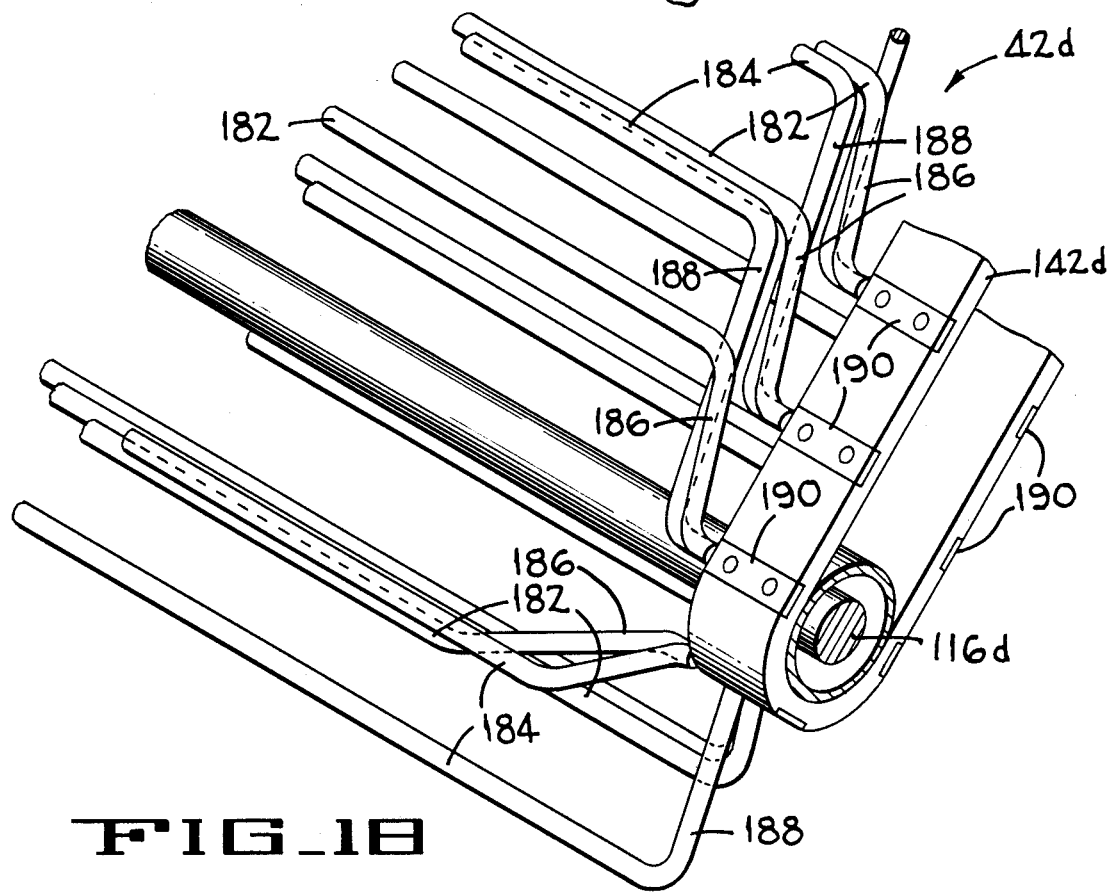
FIG_18

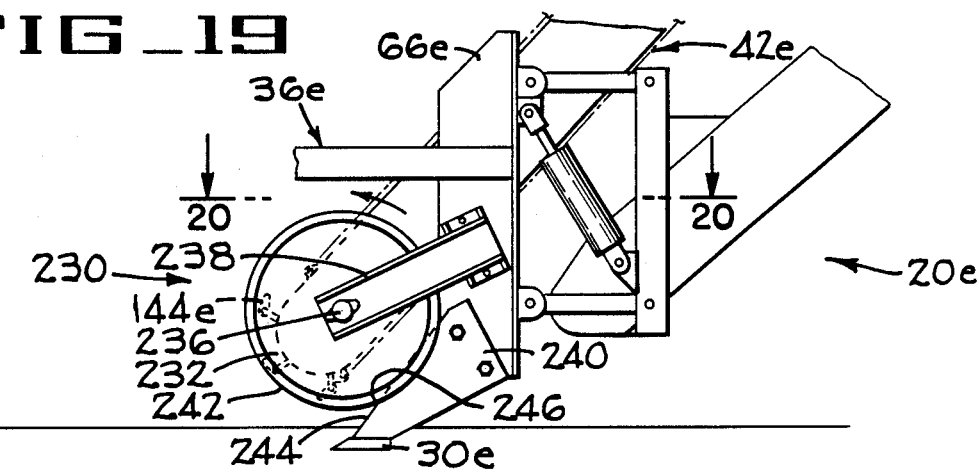
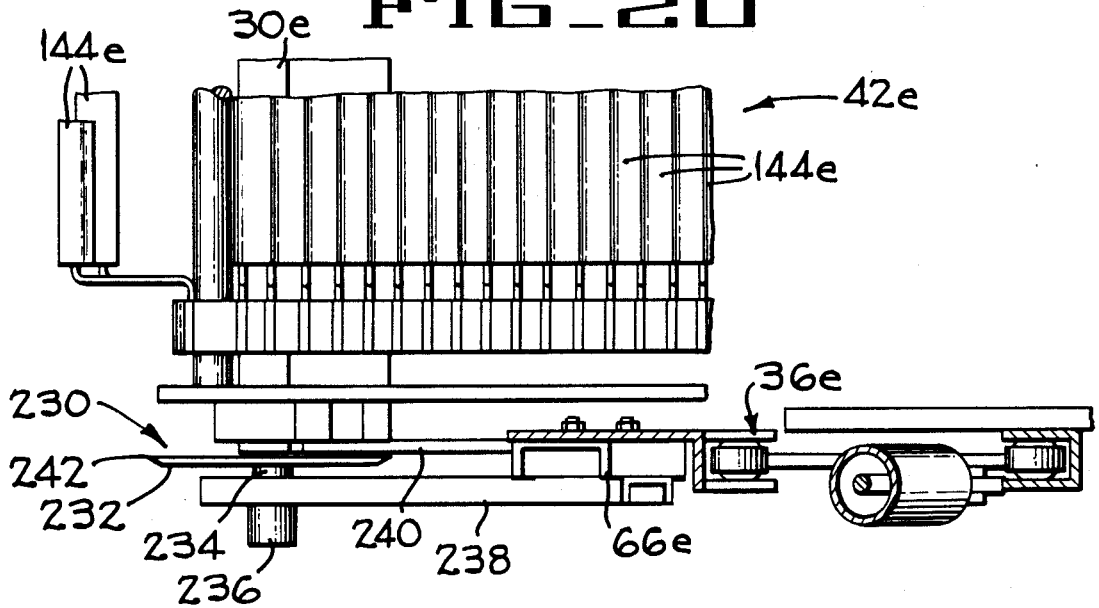
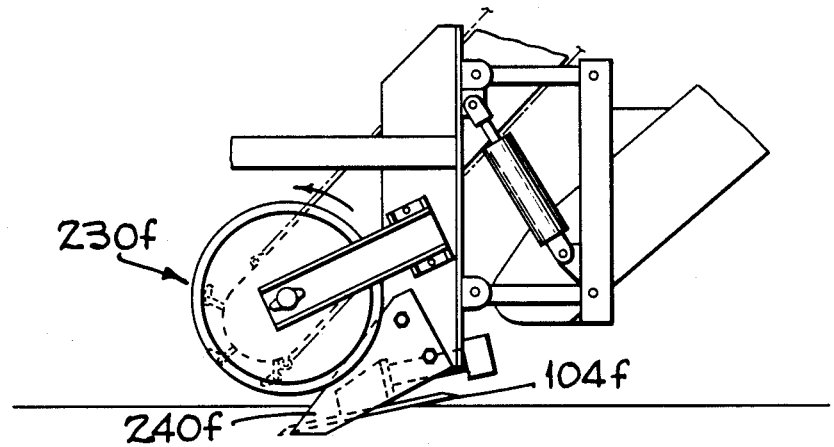

PLANT HARVESTER

CROSS REFERENCE TO RELATED APPLICATION

The present invention relates to Orlando et al. application (identified by assignee's Docket No. 06-10774) entitled Plant Harvester, which application was filed on even date herewith and is presently assigned to the assignee of the present invention.

BACKGROUND OF THE INVENTION

1. Field of the Invention

The present invention relates to mobile plant or vegetable harvesters, and more particularly relates to method and apparatus for releasing vegetables such as cucumbers from the ground, gripping the vines or foliage of the vegetable, and conveying the vines and vegetables upwardly away from the ground for release upon a main conveyor while minimizing the amount of dirt and debris deposited upon the main conveyor and maximizing the amount of vegetables deposited upon the main conveyor.

2. Description of the Prior Art

Mobile plant or vegetable harvesters are well known in the art for harvesting vegetables such as tomatoes. One such tomato harvester is disclosed in assignee's Fitzmaurice U.S. Pat. No. 4,335,570 which issued on June 22, 1982.

SUMMARY OF THE INVENTION

The components of the plant harvester of the present invention are specifically designed for harvesting cucumbers. The harvester is driven through a field of cucumbers, which cucumbers are attached to vines growing in the ground. Vine cutting means first cut a swath of vines using vertical and horizontal vine cutting means. The width of the swath is equal in width to that of a main harvester conveying system. A vine gripping conveyor then grips the vines and gently lifts vines and cucumbers from the soil with a minimum amount of dirt clinging to the vines and with most of the cucumbers attached to the vines. The vines and cucumbers are then released from the vine gripping conveyor and fall onto an inclined main conveyor for movement into means for separating the cucumbers from the vines. The vines are then discharged onto the ground rearwardly of the vehicle, and the cucumbers are collected on the vehicle for conveyance to trucks or the like moving alongside of the harvester.

BRIEF DESCRIPTION OF THE DRAWINGS

FIG. 1 is a perspective of the plant harvester, hereinafter referred to as a cucumber harvester, of the present invention.

FIG. 1A is a diagrammatic side elevation of the forward portion of a simplified plant harvester having an elongated foliage gripping pinch bar conveyor for pulling the foliage and crop from the ground for transport into a foliage and crop receiving means.

FIG. 2 is a diagrammatic central vertical section of the forward portion of the harvester illustrated in solid lines in an operative position with a horizontal vine cutter in the soil; and showing the forward portion in phantom lines in a transport position.

FIG. 3 illustrates a second embodiment of one of a plurality of rotary horizontal vine cutters.

FIG. 4 is an enlarged elevation looking at the front of the harvester illustrating the position of vertical vine cutting wheels, and conveyor height control mechanisms riding on the flat tops of ridges.

FIG. 5 is an enlarged plan view illustrating the drive for the vine gripping conveyors.

FIGS. 6, 7 and 8 are operational views illustrating control means for changing the height of the horizontal vine cutter in response to varying elevations of the ground, certain parts being cut away in FIGS. 7 and 8 to better illustrate the positions of the height control means.

FIG. 9 is a vertical section taken through the forward end of a preferred embodiment of the vine gripping conveyor, with the vine lifters or pinch bars open to receive the vines and thereafter close to grip the vines.

FIG. 10 is a perspective of a portion of the forward end of the vine gripping conveyor of FIG. 9.

FIG. 10A is a modification of the vine gripping conveyor of FIGS. 9 and 10 illustrating a Z-shaped end portion for extending the width of the bars.

FIG. 11 is a vertical section through the forward end of a second embodiment of the vine gripping conveyor.

FIG. 12 is a perspective of a portion of the vine gripping conveyor of FIG. 11.

FIG. 13 is a vertical section taken through the forward end of a third embodiment of the vine gripping conveyor.

FIG. 14 is a perspective of a portion of the vine gripping conveyor of FIG. 13.

FIG. 15 is a vertical section taken the forward end of a fourth embodiment of the vine gripping conveyor.

FIG. 16 is a perspective of a portion of the vine gripping conveyor of FIG. 15.

FIG. 17 is a vertical section through the forward end of a fifth embodiment of the vine gripping conveyor.

FIG. 18 is a perspective of a portion of the vine gripping conveyor of FIG. 17.

FIG. 19 is a side elevation of a modified vertical vine cutter which includes a driven rotary cutter for shearing the vines.

FIG. 20 is a section taken along lines 20—20 of FIG. 19.

FIG. 21 is a side elevation of the modified vine cutter of FIG. 19 but used in conjunction with the rotary horizontal vine cutters of FIG. 3.

DESCRIPTION OF THE PREFERRED EMBODIMENT

The cucumber harvester 20 (FIG. 1) of the present invention includes a chassis 22 supported on four wheels 24 driven by a motor M which also drives a hydraulic pump and generator (not shown) for providing hydraulic power and electrical power to components of the harvester. An operator station 26 includes a steering wheel 28 and conventional hydraulic and electrical controls (not shown).

In general, the harvester 20 includes a generally horizontal vine cutter 30 and vertical vine cutters 32 mounted on caster wheels 34 pivotally mounted on a sub-frame 36 that is movably supported on the pivotal forward end portion 38 of an inclined main conveyor 40. A vine gripping conveyor 42 engages the severed vines (or foliage) of the plants and move the vines V (FIG. 9) and the attached plant (hereinafter cucumbers C) onto the forward end portion 38 (FIG. 1) of main conveyor 40 for movement upwardly to foliage and crop receiving means such as a shaking assembly (not shown) within a housing 44 that separates the cucumbers from the vines. The foliage or vines are discharged on the ground rearwardly of the harvester 20, while the cucumbers or other produce are collected on a horizontal cross conveyor (not shown) within the housing 44 and are thereafter moved upwardly by an elevator 46 and are received by a telescopic cross conveyor 48 which discharges the cucumbers into a bin or the like on a truck (not shown) which drives alongside of the harvester during the harvesting operation.

More particularly, the pivotable forward end portion 38 (FIG. 2) of the main conveyor 40 is pivoted to a non-pivotal position of the frame 54 of the main conveyor by pivot pins 56 (only one being shown). The pivotal forward portion 38 of the main conveyor 40 includes a frame 58 to which is attached a pair of upstanding legs 60 (only one pair being shown) of a parallelogram linkage 62. The parallelogram linkage includes two pair of parallel arms 64 which are pivotally connected between the pairs of upstanding legs 62, and upstanding legs 66 of the sub-frame 36, which sub-frame includes frame members which movably support the vine gripping conveyor 42.

A first pair of hydraulic cylinders 68 are connected between the non-pivotable frame 54 and the upstanding legs 60. When retracted, the cylinder 68 maintain the pivotal portion 38 of the main conveyor 40 in the harvesting position illustrated in full lines in FIG. 2; when it is desired to drive the harvester along roads or the like, the rod ends of the hydraulic cylinders are extended thereby raising the forward end of the harvester to a transport position illustrated in phantom lines in FIG. 2.

When the harvester 20 is being driven through a field to harvest cucumbers or the like, the forward end of the harvester may be raised or lowered slightly to compensate for differences in the elevation of the ground enabling the horizontal vine cutter 30 and the vertical vine cutters 32 to penetrate the soil the desired depth for cutting the vines V.

As best shown in FIGS. 2, 4 and 5, two height control assemblies 70 are connected to the forward end of the sub-frame 36 by U-shaped brackets 72 that are bolted to a cross member 73. Since each of the height control assemblies 70 are identical, only one will be described in detail.

Each height control assembly 70 includes a lightweight wheel 74, such as a bicycle wheel, and is supported for rotation in a yoke 76. The yoke is pivotally connected to a vertical rod 78 (FIG. 2) by a pivot pin 80 for vertical pivotal movement. The rod is rotatably received in a sleeve 82 secured to the U-shaped bracket 72. A bracket 84 is rigidly secured to the upper end of the rod 78 and has a switch actuating member 86 pivotally connected thereto about a pivot pin or bolt 87. The switch actuating member 86 is pivotally connected to the yoke 76 by a link 88 and pivot pins 90,91. A double pole switch 92 is mounted on the bracket 84 and has a switch arm 94 received in a slot 96 formed in the switch actuating member 86. One or more springs 98 are connected between the forward end of the yoke 76 and the bracket 84 to urge the lightweight wheel 74 downwardly to compress the vines as the harvester is driven through the field.

Conventional hydraulic and electrical circuits (not shown) control the actuation of a hydraulic cylinder 100 (FIGS. 2 and 6-8) in response to the wheel 74 of the height control assembly 70 entering a depression or downward slope as illustrated in FIG. 7, or encountering a rise in elevation as illustrated in FIG. 8.

It is desirable to maintain the front end of the vine gripping conveyor 42 at approximately the same distance above the soil, and to maintain the horizontal vine cutter 30 at approximately the same distance below the soil at all times when harvesting. Accordingly, in response to the positions of the wheels 74 of the height control assembly 70 entering depressions as shown in FIG. 7, a signal from the switch will cause the piston rod of the hydraulic cylinder 100 to retract thereby lowering the sub-frame 36 thus maintaining the desired spacing of the conveyor 42 and the vine cutter 30 relative to the surface of the ground. Similarly, when the wheel 74 contacts an upward slope as illustrated in FIG. 8, the signal causes the piston rod of cylinder 100 to extend thereby raising the sub-frame and retaining the desired spacing of the conveyor 42 and cutter 30 relative to the ground.

FIG. 3 illustrates one of a plurality of driven disc cutters 104 that cooperate to define a second type of horizontal vine cutter. The cutters 104 are supported on the lower end of the upstanding leg 66 of the sub-frame 36 and are used in place of the transversely elongated horizontal vine cutter 30 (FIG. 2). A plurality of overlapping disc cutters 104 (only one being shown) are connected to the shafts of associated right angle gear drives 106 which are secured to the sub-frames 36. Each cutter 104 is driven by a hydraulic motor 108.

An important feature of the invention is the provision of the driven vine gripping conveyor 42 (FIGS. 2, 4, 5, 9 and 10) which firmly grips the vines V forwardly of the horizontal vine cutter 30 and clamps and thereafter lifts the vines from the ground with the vegetables attached thereto, and transports the vines and vegetables over the forward portion 38 of the main conveyor 40 before releasing the vines and crops onto the main conveyor 40. In this way the vines and vegetables are firmly lifted from the soil thus separating the vines and vegetables from the soil and minimizing the conveyance of dirt, rocks or mud into a vine shaker (not shown) and other components of the harvester within the housing 44 (FIG. 1).

The driven vine gripping conveyor 42 is supported on the sub-frame 36 (FIGS. 3, 4 and 5) and is in the form of two side-by-side endless conveyor sections 42' and 42" (FIGS. 4 and 5). The upper and lower ends of both conveyor sections 42',42" are supported by elongated shafts 114,116 journaled in and extending the entire width of the sub-frame 36. A hydraulic motor 130 is secured to the sub-frame 36 and has its output shaft removably secured to the upper shaft 114 thereby providing a positive drive to both the upper and lower shafts 114,116.

Aligned pairs of small diameter pulleys 134,136,138 and 140 are secured to shafts 114,116; and each pair of pulleys have a flexible rubberized fabric belt 142 trained thereover. A plurality of vine or plant gripping pinch bars 144 are rigidly secured to associated pairs of belts 142 as by bolting or bonding. The hydraulic motor 130 drives the vine gripping conveyor so that its horizontal component of speed is substantially equal to the ground speed of the harvester, which ground speed is about three miles per hour while harvesting.

The preferred embodiment of the plant gripping pinch bars 144 are best shown in FIGS. 2, 9 and 10. Each pinch bar 144 includes generally L-shaped end portions 146 (only one end being shown) and an elongated intermediate portion 148. A generally tear shaped vine pinching portion 150 is formed from a resilient material such as rubber that is preferably bonded to the intermediate portion 148 and cooperates with the next adjacent vine pinching portion 150 to grip the vines supporting the plants to be harvested, such as cucumber vines V as illustrated in FIG. 9. It will be understood that the pinch bars 144 may be used to grip tops or foliage of vegetables such as carrots and beets, different types of grains, and other plants. If it is desired to extend the length of pinching portion 150 of each bar, it will be understood that the end portions 146' (FIG. 10A) may be bent in a generally Z-shape thereby permitting the pinching portion 150' to at least partially overlap the associated belts 142'.

As illustrated in FIG. 9, the connecting portions of the pinch bars 144 are angled rearwardly about 45° relative to the upper linear run of the vine gripping conveyor 42 at which time the vine pinching portions are in overlapping vine pinching positions. However, as the pinch bars move around the arcuate portions of the lower shaft 116, the pinch bars open significantly and thereafter close slightly before the horizontal vine cutter 30 engages and severs the vines. Thereafter the pinch bars lift the vines and cucumbers from the ground for conveyance upwardly over the main conveyor 40.

When the vines reach the upper end of the vine gripping conveyor 42, the pinch bars 144 open allowing the vines and cucumbers to be released onto the main conveyor 40 which includes pins 152 (FIG. 4) which engage the vines or foliage to move them upwardly.

It will be noted that the first embodiment of the pinch bars 144 are mounted at one half the spacing on the belts 142 as compared to the pinch bars of the other embodiments thereby providing twice as many pinch points as that disclosed in certain other embodiments such as in the FIG. 11 and 12 embodiments to be described hereinafter. The design of the bars 144 (FIG. 9) is such that the vines start to be pinched very close to a vertical plane passing through the axis of the shaft 116. Each pinch bar 144 thereafter gathers a plurality of vines after passing the vertical plane, which as mentioned previously, is at approximately their lowest point in the path of travel of said bars 144.

Although a tear shaped resilient vine pinching portion 150 of the pinch bar 144 has been illustrated, it will be understood that other shapes may be used, and also that the pinch bars may be formed entirely of steel if desired. It will be also apparent that the pinch bars 144 will maintain their grip on the vines without preloading the belt 142, since the vine gripping force is substantially a vertical pinching force. The horizontal component of the speed of the lower run of the vine gripping conveyor 42 is maintained at a speed equal to or slightly slower than that of the forward speed of the harvester while harvesting the crop.

FIGS. 11 and 12 illustrate a second embodiment of the vine gripping conveyor 42. Components of the second embodiment which are the same as those of the first embodiment will be assigned the same numerals followed by the letter "a".

The vine gripping conveyor 42a includes a plurality of forward transverse pinch or gripping bars 154 and rear transverse bars 156 which are rigidly secured together and to a pair of flexible belts 142a (only one being shown) by legs 158,160 and a plate 162. As illustrated in FIG. 11, the forward legs 158 are normal to the linear portion of the flexible belt 142a, while the legs 160 supporting the rear bar 156 are angled relative to the linear portion of the belts 142a and are welded to the legs 158.

Having reference to FIG. 11, it will be noted that the space between the pinch bars 154,156 as they move around the front shaft 116a is slightly greater than that of the FIGS. 9 and 10 embodiment thereby providing slightly greater vine gathering capabilities as compared to the FIGS. 9 and 10 embodiment. However, the initial vine gripping point of the cooperating pinch bars 154,156 is disposed a greater distance rearwardly of a vertical plane passing through the axis of the shaft 116a which is a slight disadvantage. Also, the number of pinching points is about half that of the first embodiment.

FIGS. 13 and 14 illustrate a third embodiment of a vine gripping conveyor 42b. Components of the third embodiment which are the same as that of the first embodiment will be assigned the same numerals followed by the letter "b".

The vine gripping conveyor 42b includes a plurality of front transverse gripping bars 164 and rear gripping bars 166. Each front gripping bar 164 is rigidly secured to a pair of forwardly angled arms 168 which are rigidly connected to flexible belts 142b (only one being shown). Each rear gripper bar 166 is rigidly secured to a pair of rearwardly angled arms 170 (only one being shown) which are rigidly connected to the flexible belts 142b.

As illustrated in FIG. 13, as the bars 164,166 move around the axis of shaft 116b the bars 164,166 are in their closed positions which provide a very desirable wide vine gathering space as the bars move downwardly into the vines. However, the vine gripping function does not take place until both bars 164,166 become supported on the lower linear run of the belt 142b of the vine gripping conveyor which occurs a substantial distance rearwardly of a vertical plane passing through the axis of the shaft 116b.

A fourth embodiment of the vine gripping conveyor 42c is illustrated in FIGS. 15 and 16. Components of the fourth embodiment which are the same as those of the first embodiment will be assigned the same numerals followed by the letter "c".

The vine gripping conveyor 42c includes a plurality of transverse forward gripping bars 172 which are supported by short rearwardly angled (relative to the upper run of the conveyor) arms 174 rigidly secured to the flexible belts 142c (only one being shown) with the arms angled rearwardly at about 75° relative to the upper run of the vine gripping conveyor 42c. A plurality of transverse rearward gripping bars 176 are supported by long forwardly angled arms 177 rigidly secured to the pair of flexible belts 142c (only one being shown) with the angle being about 75°.

When the bars 172,176 move arcuately around the axis of shaft 116c, the bars 172,176 are in their open non-gripping position and penetrate the vines V. As the bars 172,176 move around the axis of shaft 116c and into the lower linear run of the conveyor 42c, the bars 172 on the long arms push a portion of the vines rearwardly of the harvester into vine gripping engagement with the associated bar 172 of the short arms thereby lifting the vines and crop from the soil for release onto the main conveyor 40 (FIG. 2) as the vines and crop are moved around the axis of the upper elongated shaft 114 (FIG. 3).

A fifth embodiment of the invention is illustrated in FIGS. 17 and 18. Components of a fifth embodiment which are the same as that of the first embodiment will be assigned the same numerals followed by the letter "d".

The vine gripping conveyors 42d includes a first plurality of long transverse pinch bars 182, and a second plurality of transverse pinch bars 184 which are slightly shorter than the first pinch bars 182. Each long bar 182 has two parallel short legs 186, and each short bar has two parallel legs 188, (only one leg of each bar being shown) which legs are bent 90° to the associated bar 182,184 and are welded together to define an angle of about 10° relative to each other. The free ends of the legs are rigidly secured to plates 190 which are rigidly secured to belts 142d (only one being shown).

When supported on a linear portion of the belts 142d of the vine gripping conveyor 42d, the long legs 188 are angled about 20° to the plane of the belts 142d and the short legs 186 are angled at about 30° relative to the plane of the belt 142d at which time the pinch bars 182 and 184 are in clamping engagement with the vines when on the lower run of the gripping conveyor 42d. When the transverse bars 182,184 move around the axis of the elongated shaft 116d at the lower end of the vine gripping conveyor 42d, the spacing of the adjacent transverse pinch bars 184,186 is quite wide thus enhancing the ability of the bars to gather the vines V. Also, the vines are initially gripped at a point substantially on the vertical plane passing through the axis of the shaft 116d thus improving the vine gripping operation.

Although a plurality of embodiments of pinch bars have been disclosed, it will be understood that other designs may be used. For example, the pinch bars could be in the form of flat plates, molded rubber shapes or fingers secured to the cross bars, and other equivalent shapes.

FIG. 1A illustrates a simplified plant harvester 200 which grips the foliage and pulls the foliage and attached crop from the ground for movement within a foliage and crop receiving means without first severing the crop and foliage from the ground.

The harvester 200 is a self-propelled harvester which is similar to that of the first embodiment except that the automatic height control system, the horizontal and vertical cutters, and the main conveyor are not required.

The harvester 200 (FIG. 1A) includes a self-propelled mobile chassis 202 which pivotally supports an elongated downwardly and forwardly inclined conveyor frame 204 pivoted to the chassis 202 adjacent an opening 208 of a foliage and crop receiving means 210 which may include a shaker assembly and conveyors such as that used in the first embodiment when cucumbers or tomatoes are being harvested; or which may merely be a bin and/or conveying system when crops such as carrots or turnips are being harvested.

The upper end of the conveyor frame 204 is pivotally mounted on the chassis 202 for pivotal movement about a horizontal axis A. The conveyor frame includes conventional inwardly directed flanges (not shown) upon which the side portions of the endless pinch bar conveyors 212 ride to maintain the lower run in a linear path. The pinch bar conveyor is driven by a hydraulic motor 214 in the direction indicated by the arrow and includes a lower arcuate portion 216 and an upper arcuate portion 218. A plurality of pinch bars 220 are connected to the conveyor 212 and are shown as being of the type illustrated in FIGS. 9–10a the first embodiment. However, it will be understood that the embodiments of the pinch bars illustrated in FIGS. 11–18 may be used if desired.

The lower end of the conveyor 212 is raised or lowered by a pair of hydraulic cylinders 222 (only one being shown) pivotally connected between the chassis 202 and the conveyor frame 204. A conventional hydraulic valve (not shown) is actuated by the driver of the harvester to raise or lower the front end of the conveyor 212 to maintain the lower arcuate portion 216 at a desired distance above the ground; and to move the lower arcuate portion between the harvesting position shown in solid lines and the raised transport position shown in phantom lines.

In operation of the plant harvester 200 of the second embodiment of the present invention, the harvester is first driven onto a field to be harvested. The front arcuate end of the pinch bar conveyor 212 is then lowered from its transport position to the solid line position (FIG. 1A) in position to engage the foliage of the crop or plant being harvested. As the pinch bars 220 move around the lower arcuate portion 216 of the conveyor, the pinch bars 220 are opened and engage the foliage which have not been severed from the ground. The pinch bars 220 close and grip the foliage in response to being moved from the lower arcuate portion to the lower linear run of the pinch bar conveyor. As the gripped foliage is moved up the lower run, the foliage is gripped tight enough to pull the foliage and crop out of the ground with a minimum loss of the crop.

When the foliage and crop reach the upper arcuate portion 218, the pinch bars 222 open and release the vines and crop into the foliage and crop receiving means for further processing.

Thus, the simplified embodiment of the plant harvester 200 is capable of harvesting many types of vegetables connected to vines or foliage that is dense enough to be gripped by the pinch bars. The foliage and their crops are gripped and relatively easily pulled out of the soil, especially soil that is moist, sandy or loosely packed thus precluding the need of cutter means to sever the soil.

FIGS. 19 and 20 illustrate a modified driven shear type vertical vine cutter assembly 230 which is intended as a substitute for the vine cutters 32 (FIG. 3). Although only one vine cutter assembly 230 will be described, it will be understood that two of such cutter assemblies will be used, one on each side of the vehicle. Components of the harvester which are equivalent to those of the first embodiment will be assigned the same numerals followed by the letter "e".

The forward portion of the vine gripping conveyor 42e is shown to illustrate the relationship of the pinch bar conveyor 144e relative to the vertical vine cutting assembly 230.

The rotary cutter assembly 230 comprises a pair of vertically oriented disc cutters 232 (only one being shown) mounted on opposite sides of the harvester 20e. Each disc cutter 232 is secured to a shaft 234 of a hydraulic motor 236 which is secured to an associated inclined arm 238 bolted to the upstanding leg 66e of the sub-frame 36e. A transversely extending horizontal vine cutter 30e is supported by two legs 240 (only one being shown) which are bolted to associated legs 66e. As shown in FIG. 20, a sharpened edge 242 of the disc cutter 232 is disposed closely adjacent to the outer face of the leg 240. While harvesting, the forward movement of the harvester 20a causes vines to move upwardly on the upwardly inclined leading surface 244 to a shear point 246 at which time the sharp edge 242 of the disc cutter 232 shears the vines. The disc cutter is driven in the direction of the arrow (FIG. 19) at a relatively high speed.

FIG. 21 illustrates a vertical disc cutter assembly 230f which is identical to that of FIG. 19 except that the elongated transversely extending vine cutter 30e (FIG. 19) has been removed from the leg 240f and a plurality of generally horizontal rotary disc cutters 104f (only one being shown) of the type disclosed in FIG. 3 are used to cut the vines horizontally.

As best shown in FIG. 20, during harvesting each vertical disc cutter 232 is driven by an associated motor 236 at a relatively high speed. As the harvester moves forward, the sloping forward surface 244 of each leg 240 engages and causes the vines to move upwardly to the shear point 246 at which time the sharp circular edge 242 of the disc cutter 232 cooperates with a side edge of the associated leg 240 to shear the vines.

From the foregoing description it will be apparent that a mobile plant harvester is disclosed with cucumbers being illustrated as the preferred crop. The harvester includes an inclined main conveyor having a pivotable front end portion which supports a sub-frame by means of hydraulically operated parallelogram linkages. An inclined vine gripping conveyor, a horizontal vine cutter, a pair of vertical vine cutters and at least one height control assembly are supported by the sub-frame to maintain the lower run of the vine gripping conveyor and the horizontal cutter at the desired distances relative to the surfaces of the ground in response to the height control assembly detecting variations in the level of the ground in front of the harvester. Since the foliage and attached crop is gently gripped by the lower run of the vine gripping conveyor which is moving substantially at ground speed, and since the vines and crop are moved substantially vertically upward from the soil, substantially all of the crop and a minimum of soil and other debris is deposited on the main conveyor in response to the pinch bars being opened at the upper end of the vine gripping conveyor allowing the vines and crop to fall onto the main conveyor for further processing.

Although the best mode contemplated for carrying out the present invention has been shown and described it will be apparent that modification and variation may be made without departing from what is regarded to be the subject matter of the invention.

What is claimed is:

1. A self propelled mobile harvester for removing crops and their foliage from the ground, comprising:
    means defining a main conveyor with an upwardly inclined upper run and a forward end;
    means defining an inclined pinch bar conveyor having an arcuate front portion disposed closely adjacent the ground and an arcuate rear portion disposed above said main conveyor;
    means for severing the foliage and attached crop from the ground;
    means defining a plurality of pinch bars on said pinch bar conveyor with adjacent pinch bars being opened when moving around said arcuate front portion for engaging the foliage and being closed in gripping engagement with the foliage when in a lower run of the conveyor and thereafter being opened to release the foliage and crop onto said main conveyor when moving around said arcuate rear portion; and
    means defining a sub-frame connected to said pinch bar conveyor;
    means defining a parallelogram linkage connecting said pinch bar conveyor to said main conveyor;
    power means connected to said parallelogram linkage for raising and lowering said sub-frame and said pinch bar conveyor; and
    ground level sensing means supported by said sub-frame for actuating said power means for raising and lowering said sub-frame for maintaining said front portion of said pinch bar conveyor at substantially the same distance above the ground when the harvester is driven over ground of varying levels.

2. An apparatus according to claim 1 and additionally comprising a pair of vertically oriented discs supported on said sub-frame and spaced apart a distance substantially equal to the width of the harvester, and a horizontal cutter bar supported on said sub-frame and extending transversely of the harvester a distance substantially equal to the width of the harvester, said rotary discs and horizontal bar penetrating the ground a sufficient distance for cutting a swath of foliage substantially equal to the width of the harvester.

3. An apparatus according to claim 1 and additionally comprising a pair of vertically oriented rotary discs supported on said sub-frame and spaced apart a distance substantially equal to the width of the harvester, and a plurality of driven generally horizontal discs extending substantially the full width of the harvester, said vertical discs and said horizontal discs penetrating the ground a sufficient distance for cutting a swath of foliage substantially equal to the width of the harvester.

4. An apparatus according to claim 2 and additionally comprising means for pivotally connecting a forward portion of said main conveyor to a rearward portion of said pinch bar conveyor; and power means connected between said rearward portion of said pinch bar conveyor and said main conveyor for pivoting said pinch bar conveyor and components attached thereto between a lowered harvesting position and a raised transport position.

5. An apparatus according to claim 1 wherein each of said pinch bars comprises a horizontal bar, a pair of mounting legs rigidly secured to said bar and to said pinch bar conveyor, and a transversely elongated plant gripping member secured to said horizontal bar and extending into overlapping foliage gripping engagement with the foliage gripping member of a next adjacent pinch bar for firmly gripping the foliage of the plants when in a linear portion of the lower run of said foliage gripping conveyor.

6. An apparatus according to claim 5 wherein each pair of mounting legs are disposed at about 45° relative to the linear run of the pinch bar conveyor causing the adjacent clamp gripping members to initially grip the foliage when passing through a vertical plane that passes through the axis of the arcuate lower end of the power driven endless conveyor.

7. An apparatus according to claim 6 wherein said legs are angled rearwardly at about 45° relative to the upper run of the foliage gripping conveyor.

8. An apparatus according to claim 7 wherein said legs are parallel to each other when in a linear run.

9. An apparatus according to claim 8 wherein said leg are Z-shaped transversely of the vehicle for extending the effective foliage gripping length of the bars.

10. An apparatus according to claim 1 wherein said plurality of pinch bars include sets of pinch bar assemblies; each set of pinch bar assemblies comprising a first pair of short pinch bar legs perpendicular to and rigidly secured to said pinch bar conveyor and to a first transversely extending pinch bar, a pair of long pinch bar legs rigidly secured to said first pair of short legs and to a second pinch bar which is in vine gripping engagement with the next adjacent pinch bar on short legs of the next adjacent pinch bar assembly when in a linear run, said pinch bars when moving around said arcuate front portion of said pinch bar conveyor being widely spaced thereby providing good vine gathering capabilities.

11. An apparatus according to claim 1 wherein said plurality of pinch bars are arranged in sets with a pinch bar in each set being connected by a first pair of legs to a linear run of the conveyor at an angle of about 35° in one direction; and the other bar in the set being connected by a second pair of legs spaced a greater distance apart than said first set and being connected to the linear run at an angle of about 35° in the opposite direction, each set of pinch bars gripping the foliage when moving along said lower linear run, and being widely spaced for gathering the foliage when moving around said arcuate front portion.

12. An apparatus according to claim 1 wherein a plurality of first pinch bars are connected by a first pair of legs to a linear portion of said pinch bar conveyors at an angle of about 75° in a first direction; and wherein a plurality of second pinch bars are connected by a second pair of legs to the linear portion of said pinch bar conveyor at an angle of about 75° in the opposite direction and overlapping said first pinch bars when in said linear run; said first and second pinch bars opening widely when moving around said front arcuate portion of the conveyor for gathering foliage, for gripping foliage when moving along said lower run, and for releasing the foliage and crop onto the main conveyor when moving around said rear arcuate portion.

13. An apparatus according to claim 1 wherein a plurality of first pinch bars are connected to first pairs of short legs, and a plurality of second pinch bars are connected to second pairs of long legs which are connected to associated first pairs of short legs and to said pinch bar conveyor; said short legs being at an angle of about 10° relative to the long legs connected thereto, and said long legs being at an angle of about 20° relative to the linear runs of said pinch bar conveyor.

14. In a mobile harvester for removing foliage and a crop from the ground, comprising:
means defining an inclined endless pinch bar conveyor having upper and lower linear runs connected together by upper and lower arcuate portions;
means defining a plurality of pairs of cooperating pinch bar units with each pair including two horizontally disposed transverse pinch bars supported by said conveyor with each pair of pinch bars adapted to be maintained in pinching engagement when in said linear runs and adapted to be spread apart to receive the foliage of a crop when moving downwardly and rearwardly around said lower arcuate portion and adapted to release the foliage and crop when moving upwardly and around said upper arcuate portion; and
each pair of cooperating pinch bar units comprises a pair of mounting legs secured to a transversely extending pinch bar and to said endless pinch bar conveyor; and
one foliage engaging means on each pinch bar unit overlapping a foliage engaging means on the next adjacent pinch bar unit when in said lower run.

15. An apparatus according to claim 14 wherein said foliage engaging means are tear shaped.

16. In a mobile harvester for removing foliage and a crop from the ground, comprising:
means defining an inclined endless pinch bar conveyor having upper and lower linear runs connected together by upper and lower arcuate portions;
means defining a plurality of pairs of cooperating pinch bar units with each pair including two horizontally disposed transverse pinch bars supported by said conveyor with each pair of pinch bars adapted to be maintained in pinching engagement when in said linear runs and adapted to be spread apart to receive the foliage of a crop when moving downwardly and rearwardly around said lower arcuate portion and adapted to release the foliage and crop when moving upwardly and around said upper arcuate portion;
each pinch bar unit comprises a pair of short legs secured to a first pinch bar and to said pinch bar conveyor, and a second pair of long legs secured to a second pinch bar and to said short legs with the short and long legs being at an angle of about 45° relative to each other, said first and second pinch bars being in gripping engagement when in a linear run of said inclined conveyor.

17. In a mobile harvester for removing foliage and a crop from the ground, comprising:
means defining an inclined endless pinch bar conveyor having upper and lower linear runs connected together by upper and lower arcuate portions;
means defining a plurality of pairs of cooperating pinch bar units with each pair including two horizontally disposed transverse pinch bars supported by said conveyor with each pair of pinch bars adapted to be maintained in pinching engagement when in said linear runs and adapted to be spread apart to receive the foliage of a crop when moving downwardly and rearwardly around said lower arcuate portion and adapted to release the foliage and crop when moving upwardly and around said upper arcuate portion; and
each pair of cooperating pinch bar units comprising a pair of mounting legs secured to a transversely extending pinch bar and to said endless pinch bar conveyor; when said pairs of pinch bar units are in said lower linear run, said mounting legs of each pair of pinch bar units crossing each other at angles of about 35° relative to the plane of the linear run.

18. In a mobile harvester for removing foliage and a crop from the ground, comprising:
means defining an inclined endless pinch bar conveyor having upper and lower linear runs connected together by upper and lower arcuate portions;
means defining a plurality of pairs of cooperating pinch bar units with each pair including two horizontally disposed transverse pinch bars supported by said conveyor with each pair of pinch bars adapted to be maintained in pinching engagement when in said linear runs and adapted to be spread apart to receive the foliage of a crop when moving downwardly and rearwardly around said lower arcuate portion and adapted to release the foliage and crop when moving upwardly and around said upper arcuate portion; and each pair of cooperating pinch bar units comprises a pair of mounting legs secured to a transversely extending pinch bar to said endless conveyor, one of said pairs of mounting legs being larger than said other pair of mounting legs for causing said pinch bars to be in overlapping foliage gripping engagement with other pinch bars when in said lower linear run.

19. In a mobile harvester for removing foliage and a crop from the ground, comprising:

means defining an inclined endless pinch bar conveyor having upper and lower linear runs connected together by upper and lower arcuate portions;

means defining a plurality of pairs of cooperating pinch bar units with each pair including two horizontally disposed transverse pinch bars supported by said conveyor with each pair of pinch bars adapted to be maintained in pinching engagement when in said linear runs and adapted to be spread apart to receive the foliage of a crop when moving downwardly and rearwardly around said lower arcuate portion and adapted to release the foliage and crop when moving upwardly and around said upper arcuate portion; and each pair of cooperating pinch bar units comprising a pair of short legs secured to a first pinch bar and to said pinch bar conveyor, and a second pair of long legs secured to a second pinch bar and to the short legs and said endless pinch bar conveyor with the long legs and short legs being spaced apart at an angle of about 10° and with said long legs being at an angle of about 20° relative to a linear run of said endless pinch bar conveyor.

20. In a mobile ground supported harvester adapted to be driven over a field of plants to be harvested, the combination of:

means defining an upwardly and rearwardly inclined main power driven conveyor having upper and lower end portions disposed above the level of the ground and having an upper run driven upwardly;

means defining a vertically adjustable sub-frame supported on the lower portion of said main conveyor;

means defining and inclined power driven endless foliage gripping conveyor including a plurality of horizontally extending pinch bars with adjacent pinch bars being opened in response to moving around an arcuate lower portion of said foliage gripping conveyor for receiving the foliage of plants being harvested and being firmly gripped between adjacent pinch bars, said pinch bars having an upwardly inclined lower run with said arcuate lower end disposed above the ground forward of said main conveyor and an upper arcuate end overlapping a portion of said main conveyor, said foliage gripping conveyor adapted to grip and remove the foliage and plants being harvested from the ground and thereafter releasing the foliage and plants into said main conveyor; and height control power means connected between said main conveyor and said sub-frame for raising and lowering said sub-frame for maintaining said lower end of said foliage gripping conveyor at a desired level above the ground for gripping the foliage.

21. In a mobile ground supported harvester adapted to be driven over a field of plants to be harvested, the combination of:

means defining an upwardly and rearwardly inclined main power driven conveyor having upper and lower end portions disposed above the level of the ground and having an upper run driven upwardly;

means defining a vertically adjustable sub-frame supported on the lower portion of said main conveyor;

means defining and inclined power driven endless foliage gripping conveyor including a plurality of horizontally extending pinch bars with adjacent pinch bars being opened in response to moving around an arcuate lower portion of said foliage gripping conveyor for receiving the foliage of plants being harvested and being firmly gripped between adjacent pinch bars, said pinch bars having an upwardly inclined lower run with said arcuate lower end disposed above the ground forward of said main conveyor and an upper arcuate end overlapping a portion of said main conveyor, said foliage gripping conveyor adapted to grip and remove the foliage and plants being harvested from the ground and thereafter releasing the foliage and plants into said main conveyor; and means defining a horizontal foliage cutter supported by said sub-frame and adapted to cut the foliage for releasing the foliage and plants from the ground.

22. An apparatus according to claim 23 and additionally comprising means defining a horizontal foliage cutter supported by said sub-frame and adapted to cut the foliage for releasing the foliage and plants from the ground.

23. In a mobile ground supported harvester adapted to be driven over a field of plants to be harvested, the combination of:

means defining an upwardly and rearwardly inclined main power driven conveyor having upper and lower end portions disposed above the level of the ground and having an upper run driven upwardly;

means defining a vertically adjustable sub-frame supported on the lower portion of said main conveyor;

means defining and inclined power driven endless foliage gripping conveyor including a plurality of horizontally extending pinch bars with adjacent pinch bars being opened in response to moving around an arcuate lower portion of said foliage gripping conveyor for receiving the foliage of plants being harvested and being firmly gripped between adjacent pinch bars, said pinch bars having an upwardly inclined lower run with said arcuate lower end disposed above the ground forward of said main conveyor and an upper arcuate end overlapping a portion of said main conveyor, said foliage gripping conveyor adapted to grip and remove the foliage and plants being harvested from the ground and thereafter releasing the foliage and plants into said main conveyor;

pivot means for pivotally connecting a lower portion of said main conveyor and to an upper portion of said main conveyor; and second power means for moving said lower portion of the main conveyor and components attached thereto between a lowered harvesting position and a raised transport position.

24. A method for removing crops and their foliage from a field using a ground supported mobile harvester including a main inclined conveyor with an upwardly driven run, an inclined endless pinch bar conveyor formed by a plurality of pinch bars connected together having an arcuate front portion disposed closely adjacent the ground, and an arcuate rear portion disposed above the main conveyor with upper and lower runs connecting said arcuate portions, the method comprising the steps of;

driving the harvester through the field;

severing the foliage from the ground;

opening the pinch bars on the pinch bar conveyor in response to moving the pinch bars around said lower arcuate portion for engaging and collecting the foliage;

gripping the foliage by closing the pinch bars in response to movement along the lower run of the pinch bar conveyor for moving the foliage and attached crop over the main conveyor;

releasing the foliage and crop onto the main inclined conveyor; and sensing variations in the level of the ground forwardly of the pinch bar conveyor for maintaining the desired height of the pinch bar conveyor and the height at which the foliage is severed from the ground.

25. A method for removing crops and their foliage from a field using a ground supported mobile harvester including a main inclined conveyor with an upwardly driven run, an inclined endless pinch bar conveyor formed by a plurality of pinch bars connected together having an arcuate front portion disposed closely adjacent the ground, and an arcuate rear portion disposed above the main conveyor with upper and lower runs connecting said arcuate portions, the method comprising the steps of;

driving the harvester through the field;

severing the foliage from the ground;

opening the pinch bars on the pinch bar conveyor in response to moving the pinch bars around said lower arcuate portion for engaging and collecting the foliage;

gripping the foliage by closing the pinch bars in response to movement along the lower run of the pinch bar conveyor for moving the foliage and attached crop over the main conveyor;

releasing the foliage and crop onto the main inclined conveyor; wherein the foliage is severed horizontally and vertically for providing a swath of foliage and the attached crop that is substantially equal in width to the width of the harvester.

26. A method for removing plants and their foliage from a field using a ground supported mobile harvester including a main inclined conveyor with an upwardly driven run; a foliage gripping conveyor having a plurality of pinch bars; a lower arcuate portion closely adjacent to the ground; an upper arcuate portion disposed above the main conveyor; and a lower linear foliage gripping run; comprising the steps of:

driving the harvester through the fields;

severing the foliage from the ground;

opening the foliage gripping pinch bars in response to moving the pinch bars around the lower arcuate portion and thereafter closing the pinch bars int gripping engagement with the foliage in response to advancing the pinch bars along the lower linear run for gently gripping the foliage;

advancing the gripped foliage and attached plants along said linear run, over a portion of the main conveyor and around the upper arcuate portion for separating said pinch bars and releasing the foliage and plants onto the main conveyor; and sensing variations of the ground level forwardly of the foliage gripping conveyor for maintaining the desired levels of the foliage gripping conveyor and the position at which the foliage is severed relative to the varying ground level.

27. A self propelled mobile harvester for removing crops and their foliage from the ground comprising:

means defining a main conveyor with an upwardly inclined upper run and a forward end;

means defining an inclined pinch bar conveyor having an arcuate front portion disposed closely adjacent to the ground and an arcuate rear portion disposed above said main conveyor;

means for severing the foliage and attached crop from the ground;

means defining a plurality of horizontally disposed pinch bars on said pinch bar conveyor with adjacent pinch bars being opened in response to moving around the arcuate front portion for engaging and clamping the foliage against an adjacent pinch bar in closed position and remaining closed in gripping engagement with the foliage when in a lower run of the conveyor for lifting the foliage and attached crop and thereafter being opened to release the foliage and crop onto said conveyor in response to moving said arcuate rear portion;

means defining a pair of transversely spaced power driven vertical rotary disc cutters rotatable in a vertical plane for vertically severing vines for providing a wide swath of vines being harvested substantially equal in width to that of said inclined pinch bar conveyor;

each rotary disc cutter including an upwardly and rearwardly inclined leg having a shearing edge; a driven rotatable disc cutter having a shearing edge disposed closely adjacent said leg and defining a vine shearing point for shearing the vines; and a horizontal vine cutter attached to said legs for cooperating with a pair of said rotary disc cutters for cutting a swath of vines from the ground.

28. A self propelled mobile harvester for removing crops and their foliage from the ground comprising:

means defining a main conveyor with an upwardly inclined upper run and a forward end;

means defining an inclined pinch bar conveyor having an arcuate front portion disposed closely adjacent the ground and an arcuate rear portion disposed above said main conveyor;

means for severing the foliage and attached crop from the ground;

means defining a plurality of horizontally disposed pinch bars on said pinch bar conveyor with adjacent pinch bars being opened in response to moving around the arcuate front portion for engaging and clamping the foliage against an adjacent pinch bar in closed position and remaining closed in gripping engagement with the foliage when in a lower run of the conveyor for lifting the foliage and attached crop and thereafter being opened to release the foliage and crop around said arcuate rear portion;

means defining a pair of transversely spaced power driven vertical rotary disc cutters rotatable in a vertical plane for vertically severing vines for providing a wide swath of vines being harvested substantially equal in width to that of said inclined pinch bar conveyor; and means defining a plurality of substantially horizontal power driven cutters for cooperating with said rotary disc cutters for cutting a swath of vines from the ground.

\* \* \* \* \*